United States Patent
Ali et al.

(10) Patent No.: US 12,390,726 B2
(45) Date of Patent: Aug. 19, 2025

(54) SYSTEM AND METHOD FOR GENERATING A SCALED CONTROL SIGNAL FOR A VIDEO GAME CONSOLE USING A VIDEO GAME CONTROLLER, AND A STOP MEMBER TO LIMIT DISPLACEMENT OF A CONTROL STICK

(71) Applicant: COLLECTIVE MINDS GAMING CO. LTD., Maple Ridge (CA)

(72) Inventors: Darren Ali, Maple Ridge (CA); Ken Dornbusch, Maple Ridge (CA)

(73) Assignee: Collective Minds Gaming Co. Ltd., Maple Ridge (CA)

( * ) Notice: Subject to any disclaimer, the term of this patent is extended or adjusted under 35 U.S.C. 154(b) by 613 days.

(21) Appl. No.: 17/545,837

(22) Filed: Dec. 8, 2021

(65) Prior Publication Data

US 2022/0274015 A1 Sep. 1, 2022

Related U.S. Application Data

(60) Provisional application No. 63/117,186, filed on Nov. 23, 2020.

(51) Int. Cl.
*A63F 13/40* (2014.01)
*A63F 13/24* (2014.01)

(52) U.S. Cl.
CPC .............. *A63F 13/40* (2014.09); *A63F 13/24* (2014.09)

(58) Field of Classification Search
CPC .......... A63F 13/40; A63F 13/24; A63F 13/22; A63F 13/42; A63F 13/92
See application file for complete search history.

(56) References Cited

U.S. PATENT DOCUMENTS

| 4,552,360 A | 11/1985 | Bromley et al. |
| 4,641,839 A | 2/1987 | Turner |

(Continued)

FOREIGN PATENT DOCUMENTS

| CA | 201150 | 6/1920 |
| CA | 201152 | 6/1920 |

(Continued)

OTHER PUBLICATIONS

"Review: Scuf Xbox 360 Controller" by Dave Burns, published Oct. 20, 2010. Source http://www.xboxer360.com/features/review-scuf-xbox-360-controller/ Accessed Oct. 22, 2010.

(Continued)

*Primary Examiner* — Peter J Iannuzzi
(74) *Attorney, Agent, or Firm* — Bennett Jones LLP

(57) ABSTRACT

A processor receives a control signal indicative of the displacement value of a video game controller's actuator from a neutral position, determines the displacement value of the actuator based on the control signal, determines a scaled displacement value by multiplying the determined displacement value by a scaling factor (which may be set to null for some displacement values), generates a scaled control signal indicative of the scaled displacement value, and transmits the scaled control signal to a video game console. The invention may be used to correct for "drift" phenomenon of the actuator (e.g., a directional control stick), or to generate a scaled control signal indicative of a scaled displacement value of the actuator, which is physically prevented by presence of a stop member that limits displacement of the actuator. Also, a stop member is provided for limiting displacement of a directional control stick of the video game controller.

20 Claims, 6 Drawing Sheets

(56) References Cited

U.S. PATENT DOCUMENTS

| | | |
|---|---|---|
| 5,531,443 A | 7/1996 | Cruz |
| 5,551,693 A | 9/1996 | Goto et al. |
| D376,826 S | 12/1996 | Ashida |
| D377,198 S | 1/1997 | Oikawa et al. |
| D384,112 S | 9/1997 | Riley et al. |
| 5,670,988 A | 9/1997 | Tickle |
| D386,544 S | 11/1997 | Kajikawa et al. |
| 5,716,274 A | 2/1998 | Goto et al. |
| D393,291 S | 4/1998 | Kung |
| 5,759,100 A | 6/1998 | Nakanishi |
| 5,853,326 A | 12/1998 | Goto et al. |
| 5,874,906 A | 2/1999 | Willner et al. |
| 5,883,690 A | 3/1999 | Meyers et al. |
| 5,896,125 A | 4/1999 | Niedzwiecki |
| D409,183 S | 5/1999 | Chen |
| D410,643 S | 6/1999 | Tonino |
| 5,923,317 A | 7/1999 | Sayler et al. |
| D414,484 S | 9/1999 | Oikawa |
| D415,145 S | 10/1999 | Oikawa et al. |
| D416,247 S | 11/1999 | Flender et al. |
| 5,984,548 A | 11/1999 | Willner et al. |
| 5,984,785 A | 11/1999 | Takeda et al. |
| 6,001,014 A | 12/1999 | Ogata et al. |
| 6,019,680 A | 2/2000 | Cheng |
| 6,102,803 A | 8/2000 | Takeda et al. |
| D431,604 S | 10/2000 | Chan |
| 6,135,886 A | 10/2000 | Armstrong |
| 6,171,191 B1 | 1/2001 | Ogata et al. |
| D438,178 S | 2/2001 | Hames |
| 6,186,896 B1 | 2/2001 | Takeda et al. |
| 6,210,278 B1 | 4/2001 | Klitsner |
| 6,225,975 B1 | 5/2001 | Furuki et al. |
| 6,231,444 B1 | 5/2001 | Goto et al. |
| 6,241,611 B1 | 6/2001 | Takeda et al. |
| 6,261,180 B1 | 7/2001 | Lebensfeld et al. |
| 6,267,673 B1 | 7/2001 | Miyamoto et al. |
| 6,279,906 B1 | 8/2001 | Sanderson et al. |
| 6,280,327 B1 | 8/2001 | Leifer et al. |
| 6,342,009 B1 | 1/2002 | Soma |
| 6,394,906 B1 | 5/2002 | Ogata |
| D469,436 S | 1/2003 | Hussaini et al. |
| D471,552 S | 3/2003 | Loughnane et al. |
| 6,572,108 B1 | 6/2003 | Bristow |
| 6,659,871 B2 | 12/2003 | Leifer et al. |
| 6,743,100 B1 | 6/2004 | Neiser |
| 6,773,349 B2 | 8/2004 | Hussaini et al. |
| 6,811,491 B1 | 11/2004 | Levenberg et al. |
| 6,881,147 B2 | 4/2005 | Nashi et al. |
| D545,317 S | 6/2007 | Wang et al. |
| 7,283,125 B2 | 10/2007 | Martinez et al. |
| D575,350 S | 8/2008 | Ashida et al. |
| D585,931 S | 2/2009 | Palmer |
| D610,625 S | 2/2010 | Guinchard et al. |
| 7,762,553 B2 | 7/2010 | Harris |
| D620,939 S | 8/2010 | Suetake et al. |
| D624,080 S | 9/2010 | Jennings et al. |
| D624,601 S | 9/2010 | Grossman |
| 7,859,514 B1 | 12/2010 | Park |
| D631,098 S | 1/2011 | Ashida et al. |
| D631,476 S | 1/2011 | Piedra et al. |
| D632,340 S | 2/2011 | Guinchard et al. |
| D632,742 S | 2/2011 | Mueller |
| D632,743 S | 2/2011 | Mueller |
| D633,153 S | 2/2011 | Holcomb et al. |
| D638,017 S | 5/2011 | Ortiz |
| 8,142,269 B2 | 3/2012 | Tsukahara |
| D665,026 S | 8/2012 | VanBuren |
| D667,892 S | 9/2012 | Burgess et al. |
| 8,267,786 B2 | 9/2012 | Ikeda |
| D673,618 S | 1/2013 | Harper |
| D685,434 S | 7/2013 | Ali et al. |
| 8,576,199 B1 | 11/2013 | Pryor |
| 8,608,564 B2 | 12/2013 | Navid |
| 8,641,525 B2 | 2/2014 | Burgess et al. |
| D706,874 S | 6/2014 | Ngoy et al. |
| 8,740,708 B2 | 6/2014 | Karacal et al. |
| 8,753,206 B2 | 6/2014 | Ali et al. |
| D708,675 S | 7/2014 | Delrue et al. |
| D710,945 S | 8/2014 | Biheller et al. |
| D717,875 S | 11/2014 | Uhrman et al. |
| D721,139 S | 1/2015 | Burgess et al. |
| D723,032 S | 2/2015 | Schoenith et al. |
| 8,976,857 B2 | 3/2015 | Rosen et al. |
| D733,802 S | 7/2015 | Burgess et al. |
| 9,089,770 B2 | 7/2015 | Burgess et al. |
| D736,322 S | 8/2015 | Navid |
| D737,273 S | 8/2015 | Schoenith et al. |
| D748,734 S | 2/2016 | Burgess et al. |
| D752,150 S | 3/2016 | Young et al. |
| D752,688 S | 3/2016 | Jensen |
| 9,289,688 B2 | 3/2016 | Burgess et al. |
| 9,308,450 B2 | 4/2016 | Burgess et al. |
| 9,409,088 B2 | 8/2016 | Antonio |
| D777,260 S | 1/2017 | Burgess et al. |
| D778,989 S | 2/2017 | Ali et al. |
| D787,606 S | 5/2017 | Coe |
| D800,223 S | 10/2017 | Navid |
| D808,466 S | 1/2018 | Foster et al. |
| D810,202 S | 2/2018 | Foster et al. |
| D810,831 S | 2/2018 | Ali et al. |
| D819,140 S | 5/2018 | Ali et al. |
| 10,232,254 B2 | 3/2019 | Gassoway et al. |
| 10,252,173 B2 | 4/2019 | Dornbusch et al. |
| D849,146 S | 5/2019 | Kuoch et al. |
| 10,427,035 B2 | 10/2019 | Schmitz et al. |
| 10,463,979 B2 | 11/2019 | Dornbusch et al. |
| D870,207 S | 12/2019 | Ali et al. |
| 10,625,152 B2 | 4/2020 | Biheller |
| D905,060 S | 12/2020 | Tsuchida |
| D909,488 S | 2/2021 | Zheng |
| D934,343 S | 10/2021 | Ali et al. |
| 11,192,037 B2 | 12/2021 | Dornbusch et al. |
| 2001/0012801 A1 | 8/2001 | Komata |
| 2004/0224768 A1 | 11/2004 | Hussaini et al. |
| 2006/0084504 A1 | 4/2006 | Chan et al. |
| 2009/0088250 A1 | 4/2009 | Carslon et al. |
| 2012/0244944 A1 | 9/2012 | Kotkin |
| 2013/0324236 A1 | 12/2013 | Koppe |
| 2015/0363007 A1 | 12/2015 | Lysenko |
| 2017/0001109 A1 | 1/2017 | Dornbusch et al. |
| 2017/0354895 A1 | 12/2017 | Dornbusch et al. |
| 2018/0264355 A1* | 9/2018 | Burgess .......... A63F 13/20 |
| 2019/0126140 A1* | 5/2019 | Nelson .......... A63F 13/20 |
| 2020/0038766 A1 | 2/2020 | Dornbusch et al. |

FOREIGN PATENT DOCUMENTS

| | | |
|---|---|---|
| CA | 207342 | 1/1921 |
| CA | 142555 S | 4/2013 |
| CA | 2747151 A1 | 11/2015 |
| CA | 162784 S | 11/2016 |
| CA | 2969968 A1 | 12/2017 |
| CA | 3049007 A | 7/2018 |
| CA | 169939 S | 11/2018 |
| CA | 2977382 A1 | 12/2018 |
| CA | 2932358 C | 7/2020 |
| CA | 187859 S | 11/2020 |
| CA | 3141811 | 5/2022 |
| GB | 2481633 A | 1/2012 |

OTHER PUBLICATIONS

Collective Minds D-Grip Directional Pad & Silicone Cover-Black: Published Nov. 1, 2018 [online], site visited Sep. 11, 2019. Available from Internet URL: https://www.amazon.com/dp/B07J2JVFRD/ref=cm_sw_r_tw_dp_U_x_OUyEDbNFYWRGV (Year: 2018).

Collective Minds D-Grip D-Pad Covers for the Nintendo Switch's Joy-Cons Left/Right: Published May 9, 2019 [online], site visited Sep. 11, 2019. Available from Internet URL: https://imgur.com/gallery/cYJvEnB (Year: 2019).

(56) References Cited

OTHER PUBLICATIONS

Collective Minds Strike Pack Eliminator Adapter for Xbox One, online, no post date, URL: https://www.strikepackeliminator.com/, retrieved Apr. 13, 2020.
Xbox One (XB1) Collective Minds Strike Pack Setup, YouTube online, post date Dec. 14, 2018, URL: https://www.youtube.com/watch?v=wuSH3-K4EJQ, retrieved Apr. 13, 2020.
Joy-Con Gel Guards with Thumb Grips Caps for Nintendo Switch (Black) MIBOTE: Published Mar. 14, 2017 [online], site visited Sep. 11, 2019. Available from Internet URL: https://www.amazon.com/dp/B06XKT1M5K/ref=cm_sw_r_tw_dp_U_x_A6yEDb2G16V2C (Year. 2017).
Joy-Con Special Cover soft type for Nintendo Switch [Hori] Gametech Direct: Published Nov. 24, 2017 [online], site visited Sep. 11, 2019. Available from Internet URL: https://www.amazon.com/dp/B01N3559HY/ref=cm_sw_r_tw_dp_U_x_fYyEDbX1NA32S (Year: 2017).
Best Buy. (n.d.). PowerA-Fusion Pro Wired Controller for Xbox One—White-B. https://www.bestbuy.com/site/powera-fusion-pro-controller-for-xbox-one-xbox-one-s-and-xbox-one-x-white-b/6356693.p?skuId=6356693.
Machkovech, S. (Jul. 15, 2015). Microsoft unveils new $150 Xbox One Elite controller—and we've held it. Arstechnica. https://arstechnica.com/gaming/2015/06/microsoft-unveils-new-xbox-one-elite-controller-and-weve-held-it/.
Kelly, S. (Dec. 7, 2015). Steam Under Fire—New Case: Ironburg Inventions v Valve (NDGA 2015). PatentArcade. http://www.patentarcade.com/2015/12/steam-under-fire-new-case-ironburg.html.

\* cited by examiner

SYSTEM AND METHOD FOR GENERATING A SCALED CONTROL SIGNAL FOR A VIDEO GAME CONSOLE USING A VIDEO GAME CONTROLLER, AND A STOP MEMBER TO LIMIT DISPLACEMENT OF A CONTROL STICK

FIELD OF THE INVENTION

The present invention relates to systems and methods for generating a control signal for a video game console using a video game controller. The present invention also relates to a stop member to limit displacement of a control stick of a video game controller from a neutral position of the control stick.

BACKGROUND OF THE INVENTION

Console-based video game systems are supplied with a hand-held video game controller that includes a directional control stick and one or more trigger buttons.

The control stick is used for directional control of an object in game play. With use, components associated with the control stick such as a potentiometer, or a biasing spring may be worn or damaged. This can result in "drift" or "phantom input"—i.e., when the control stick is in the neutral position, the controller generates a control signal as if the control stick were displaced from its neutral position. This drift interferes with precise and accurate directional control of the object in game play.

The trigger button is often used for firing a weapon in game play. In order to facilitate rapid firing, the controller may be modified with a trigger stop to limit displacement of the trigger button from its neutral position to a fraction of its full pull length. The controller, however, may be configured to generate different control signals along the full pull length of the trigger button. For example, depressing the trigger button to 100 percent of its pull length may result in a different firing action than when depressing the trigger button to only 30 percent of its pull length. If so, then use of the trigger stop will prevent the controller from generating the full range of control signals during game play.

There remains a need to prevent drift, and to correct drift of the control stick. There also remains a need in the art to generate the full range of control signals, even when a trigger stop limits displacement of the trigger button to a fraction of its pull length.

SUMMARY OF THE INVENTION

In summary, the invention relates to a processor configured to receive a control signal indicative of the displacement value of a video game controller's actuator from a neutral position, determine the displacement value of the actuator based on the control signal, determine a scaled displacement value by multiplying the determined displacement value by a scaling factor (which may be set to null for some displacement values), generate a scaled control signal indicative of the scaled displacement value, and transmit the scaled control signal to a video game console. The invention may be used to correct for "drift" phenomenon of the actuator (e.g., a directional control stick), or to generate a scaled control signal indicative of a scaled displacement value of the actuator, which is physically prevented by presence of a stop member (e.g., a trigger stop) that limits displacement of the actuator (e.g., a trigger button). Also, a stop member may be provided for limiting displacement of a directional control stick of the video game controller from a neutral position of the control stick.

In a first aspect, the present invention comprises a system for generating a scaled control signal for a video game console using a video game controller comprising an actuator. The controller is configured to generate a control signal encoding data indicative of a displacement value of the actuator from a neutral position of the actuator. The system comprises: a controller interface for receiving the control signal from the controller; a console interface for transmitting the scaled control signal to the console; a processor; and a memory. The processor is operatively connected to the controller interface to receive the control signal from the controller interface, and operatively connected to the console interface to transmit the scaled control signal to the console interface. The memory comprises a non-transitory computer readable medium operatively connected to the processor, and stores instructions executable by the processor to implement a method. The method comprises the steps of:

(a) receiving the control signal from the controller interface;
(b) determining the displacement value of the actuator based on the data encoded by the control signal;
(c) determining a scaled displacement value by multiplying the determined displacement value by a scaling factor;
(d) generating the scaled control signal encoding data indicative of the scaled displacement value; and
(e) transmitting the scaled control signal to the console interface.

In a second aspect, the present invention comprises a method for generating a scaled control signal for a video game console using a video game controller comprising an actuator. The controller is configured to generate a control signal encoding data indicative of on a displacement value of an actuator from a neutral position of the actuator. The method, using a processor, comprises the steps of:

(a) receiving the control signal from the controller;
(b) determining the displacement value of the actuator based on the data encoded by the control signal;
(c) determining a scaled displacement value by multiplying the determined displacement value by a scaling factor;
(d) generating the scaled control signal encoding data indicative of the scaled displacement value; and
(e) transmitting the scaled control signal to the console.

In some embodiments, the system further comprises a housing retaining the controller interface, the console interface, the processor, and the memory, and adapted for attachment to the controller. In embodiments of the method of the second aspect, the method further comprises the step of attaching a housing to the controller, wherein the housing retains the processor.

In some embodiments, the controller interface comprises a first cable connector, and/or the console interface comprises a second cable connector. In some embodiments, the processor receives the control signal from the controller via a first cable connector, and/or the processor transmits the scaled control signal to the console via a second cable connector.

In some embodiments of the system or method, the scaling factor is null if the determined displacement value is less than a predetermined non-null value. Performance of steps (d) and (e) may be conditional on either the determined scaled displacement value being a non-null value, or the scaling factor being a non-null value.

In some embodiments of the system or method, performance of steps (c), (d), and (e) are conditional on the determined displacement value being less than a predetermined non-null value.

In some embodiments of the system or method, the scaling factor may be constant or non-constant for different determined displacement values.

In some embodiments, the system further comprises a stop member attachable to the controller to permit limited displacement of the actuator from the neutral position. In some embodiments, the method further comprises the step of attaching a stop member to the controller to permit limited displacement of the actuator from the neutral position. In some embodiments of the system or the method, the actuator may comprise a directional control stick, in which case the stop member may comprise a collar that surrounds the control stick when attached to the controller. The stop member may attach to the control stick to move in unison with the control stick. The stop member may engage a portion of the controller, other than the control stick, to limit displacement of the control stick from the neutral position. The collar may comprise a pair of arcuate portions that clamp the control stick between them to attach the collar to the control stick. The arcuate portions may be pivotally connected to each other to allow for separation of opposing ends the arcuate portions from each other. One of the arcuate portions may define a tab, and the other one of the arcuate portions may define a slot that releasably receives the tab by friction fit. In embodiments, the actuator may comprise a trigger button, in which case the stop member may attach to a portion of the controller, other than the trigger button, and be engaged by the trigger button to limit displacement of the trigger button from the neutral position. In some embodiments of the system or the method, the scaling factor is a ratio of a maximum possible displacement of the actuator from the neutral position when the stop member is not attached to the controller, to a maximum possible displacement of the actuator from the neutral position when the stop member is attached to the controller.

In another aspect, the present invention comprises a stop member for permitting limited displacement of a directional control stick of a video game controller from a neutral position of the control stick. The stop member comprises a collar that surrounds the control stick when attached to the controller. The stop member may attach to the control stick to move in unison with the control stick. The stop member engages a portion of the controller, other than the control stick, to limit displacement of the control stick from the neutral position. The collar may comprise a pair of arcuate portions that clamp the control stick between them to attach the collar to the control stick. The arcuate portions may be pivotally connected to each other to allow for separation of opposing ends of the arcuate portions from each other. One of the arcuate portions may define a tab, and the other one of the arcuate portions may define a slot that releasably receives the tab by friction fit.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

The invention relates to systems and method for generating a control signal for a video game console using a video game controller. Any term or expression not expressly defined herein shall have its commonly accepted definition understood by a person skilled in the art.

Video Game Controller in the Prior Art.

Figure 1:
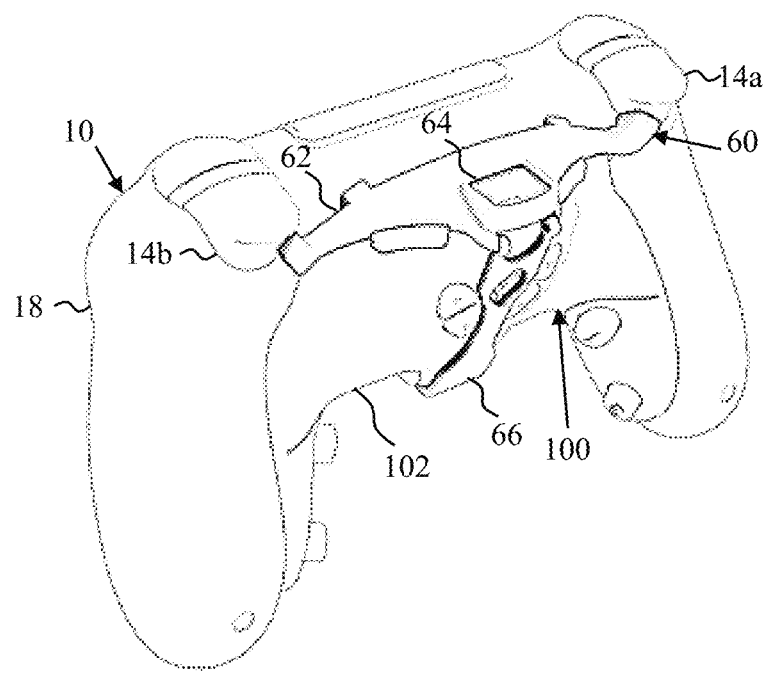
FIG. 1 shows a bottom perspective view of an embodiment of an adapter, and a stop member in the form of a trigger stop, both in accordance with the present invention, attached to a video game controller in the prior art.
Figure 2:
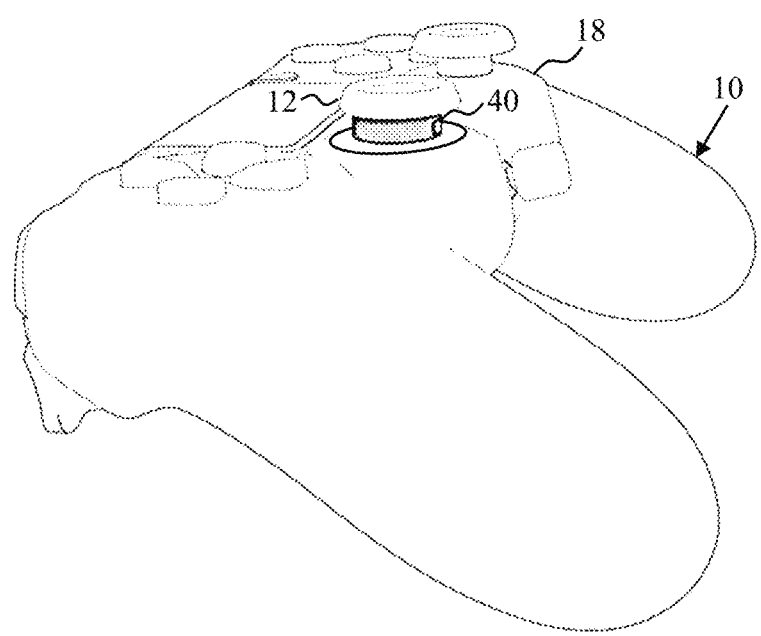
FIG. 2 shows a top perspective view of an embodiment of a stop member in the form of a stick shield, of the present invention, attached to a video game controller in the prior art.

FIGS. 1 and 2 show a video game controller 10, having conventional actuators. An embodiment of the present invention comprises a controller 10 are a stick shield 40, a trigger stop 60, and an adapter 100 which are removably attached to the controller 10.

As used herein, an "actuator" of a controller refers to any mechanism that can be displaced from a neutral position by application of force by a human user, in order to initiate a game function. As used herein, "neutral position" of the actuator refers to the position of the actuator when not subjected to any force applied by a user. Non-limiting example of actuators include a directional control stick, a trigger button, a lever, a directional keypad, and a steering wheel. The actuator may be biased into the neutral position, for example, by a spring which can be overcome by the force applied by the user. Non-limiting examples of game functions initiated by the actuator include directional control of an object or character, or firing a weapon in game play.

As non-limiting examples, the controller 10 in the prior art may be a controller supplied with a video game console such as PlayStation™ (Sony Interactive Entertainment), Xbox™ (Microsoft Corporation), or Nintendo Switch™

(Nintendo PTD). In the embodiment shown, controller 10 has an actuator in the form an omni-directional control stick 12, having a neutral position corresponding to its idle position, which typically corresponds to no directional input for an object in game play. Controller 10 has second and third actuators in the form of trigger buttons 14a, 14b, having neutral positions corresponding to their undepressed positions.

The present invention is premised on controller 10 being configured to generate a control signal encoding data indicative of a displacement value of an actuator from its neutral position. However, the present invention is not limited by any particular manner in which such control signal is generated. As a non-limiting example, the actuator of controller 10 may be physically connected to a potentiometer that varies the voltage level of an electric current supplied to a microcontroller of controller 10, depending on the displacement of the actuator from its neutral position. Based on the voltage level of the received electric current, the microcontroller of controller 10 generates the control signal with a bit stream having values that are indicative of the displacement value of the actuator from its neutral position. Ordinarily, controller 12 transmits this control signal directly to a video game console having an operating system that processes the bit stream to determine the displacement value, which in turn dictates the game function in game play.

System of the Present Invention.

FIGS. 1 and 2 show an embodiment of the system of the present invention, including stop members in the form of a stick shield 40 (FIG. 2) and trigger stop 60 (FIG. 1), and adapter 100 (FIG. 1), attached to controller 10. Stick shield 40 is removably attached to control stick 12 of controller. Trigger stop 60 is removably attached to the housing 18 of controller 10.

Stop Member.

As used herein, "stop member" refers to any physical device that is attachable to the actuator or another portion of controller 10 to limit displacement (either linear, or angular) of an actuator from its neutral position to an amount less than its full potential displacement value—i.e., the maximum possible displacement (either linear, or angular) of the actuator in the absence of the stop member. As a non-limiting example, the stop member may permit the actuator to be displaced only to 30 percent of its full potential displacement value.

Stop Member: Stick Shield.

In the embodiment shown in FIG. 2, one of the stop members is in the form of stick shield 40 to limit displacement of control stick 12 from its neutral position. In this embodiment, stick shield 40 comprises a collar that removably attaches to the control stick 12 so as to move in unison with control stick 12. In this embodiment, the stick shield 40 effectively increases the diameter of control stick 12. Thus, when control stick 12 is displaced (e.g., by 30 percent of its full potential angular displacement value), stick shield 40 engages a surrounding portion of housing 18 of controller 10 and thereby prevents further displacement of control stick 12. In an alternative embodiment, not shown, stick shield 40 may be an annular member that attaches to housing 18 of controller 10, so that it surrounds the control stick 12 and remains stationary relative to the housing 18 of controller 10.

Figure 3:
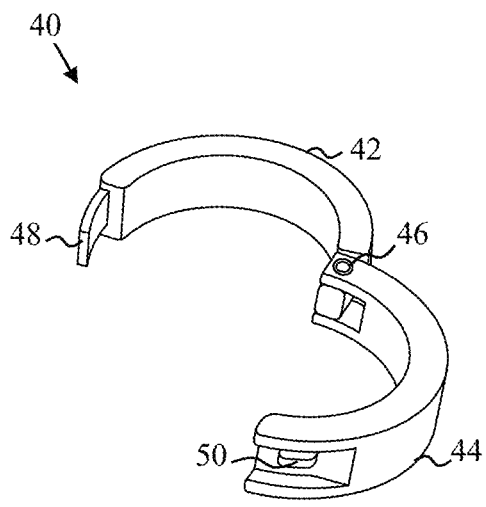
FIG. 3 shows a perspective view of the stick shield of FIG. 2 in an open configuration.
Figure 4:
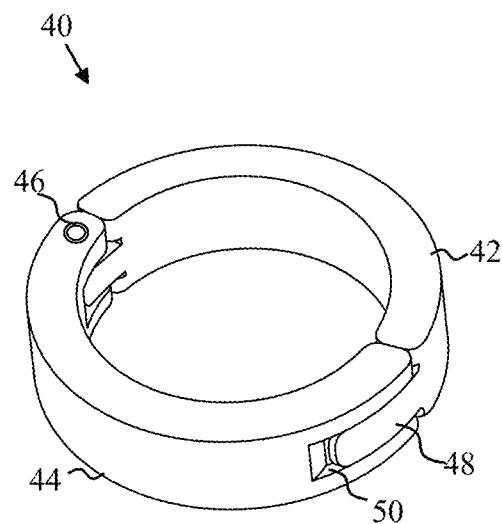
FIG. 4 shows a perspective view of the stick shield of FIG. 2 in a closed configuration.

Referring to FIGS. 3 and 4, in this embodiment, the collar of stick shield 40 comprises a pair of arcuate portions 42, 44 that clamp control stick 12 between them to attach the collar to control stick 12. The arcuate portions 42, 44 are preferably semi-circular, and pivotally connected to each other by a pin connection 46 to allow for separation of opposing ends the arcuate portions 42, 44 in the open configuration as shown in FIG. 3, which allows stick shield 40 to be placed around control stick 12. Arcuate portions 42, 44 may engage each other in a releasable manner, such as by friction fit. For example, portion 42 may define a tab 48, and the other arcuate portion 44 may define a slot 50 that releasably receives tab 48 by friction fit, to retain stick shield 40 in the closed configuration as shown in FIG. 4, which allows stick shield 40 to be attached to control stick 12.

Stick shield 40 may be used to prevent development of the "drift" or "phantom input" phenomenon described above, over time and with increased usage. By limiting displacement of control stick 12, stick shield 40 may limit stresses on strains on associated components such as potentiometers and biasing springs. This may help to avoid wear, damage, or deformation of these components, which can lead to the "drift" phenomenon.

Stop Member: Trigger Stop.

In the embodiment shown in FIG. 1, one of the stop members is in the form of trigger stop 60 to limit displacement of trigger buttons 14a, 14b from their neutral positions.

In this embodiment, trigger stop 60 includes a yoke-shaped member 62 defining an aperture 64 that slides onto a protuberance formed by housing 102 of adapter 100 (described below), and a pivotally attached clasp 66 that releasably secures trigger stop 60 to the housing 102 of adapter 100. When either of the trigger buttons 14a, 14b is depressed to a fraction (e.g., 30 percent) of its full potential displacement value, trigger stop 60 is engaged by trigger button 14a or 14b (as the case may be), to prevent further displacement of the trigger button 14a or 14b (as the case may be).

Trigger stop 60 may be used to facilitate rapid firing of trigger buttons 14a, 14b. By limiting travel of trigger buttons 14a, 14b to a fraction of their full potential pull displacement value, trigger buttons 14a, 14b can return more quickly to their neutral positions to be pulled again by a human user.

Adapter.

As will be described below, one use of adapter 100 is to correct for the "drift" phenomenon of control stick 12, in which case adapter 100 may be useful even in the absence of a stop member (e.g., stick shield 40, or trigger stop 60). Another use of adapter 100 is to generate a "scaled control signal" (as described below) encoding data indicative of a displacement value of the actuator (e.g., control stick 12, or trigger buttons 14a, 14b) that is physically prevented by presence of a stop member (e.g., stick shield 40, or trigger stop 60).

Figure 5:
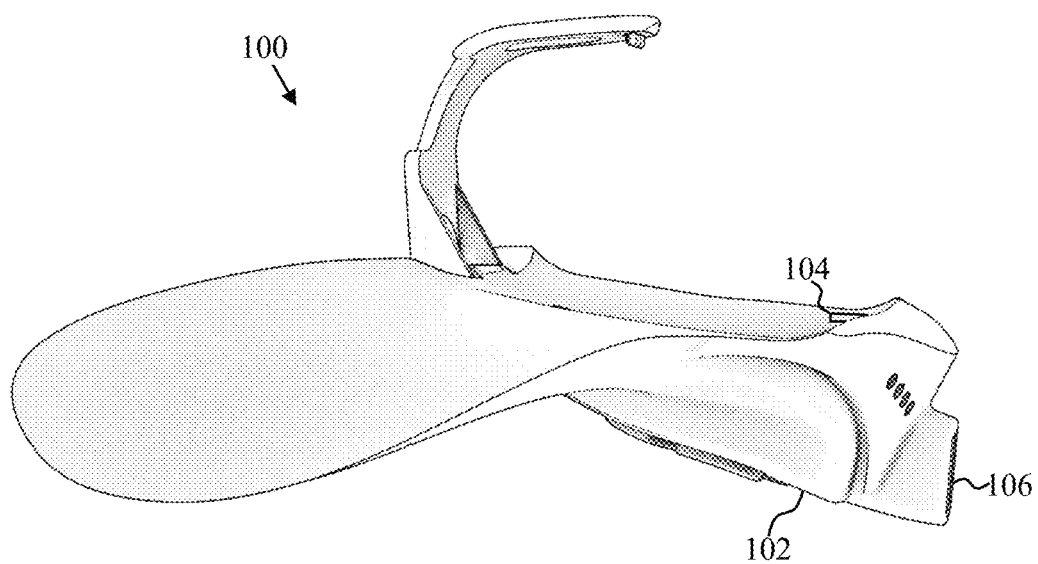
FIG. 5 shows a side view of the embodiment of the adapter of FIG. 1.
Figure 6:
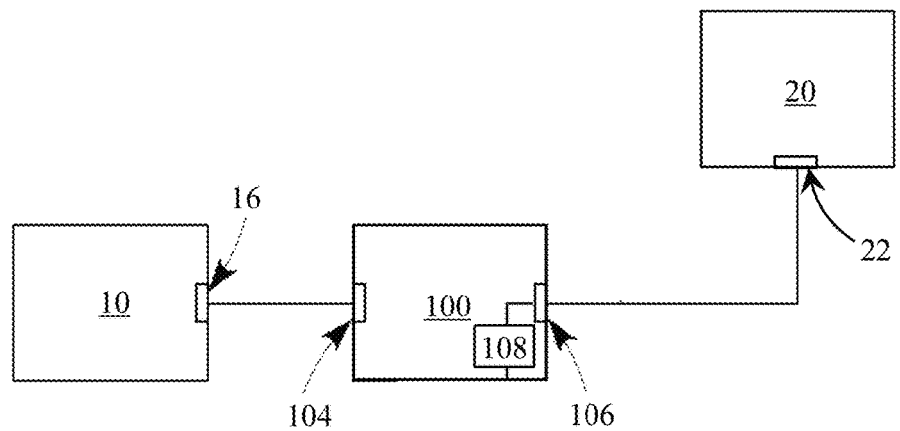
FIG. 6 shows a functional block diagram of an embodiment of an adapter of the present invention, in relation to a video game controller in the prior art and a video game console in the prior art.
Figure 7:
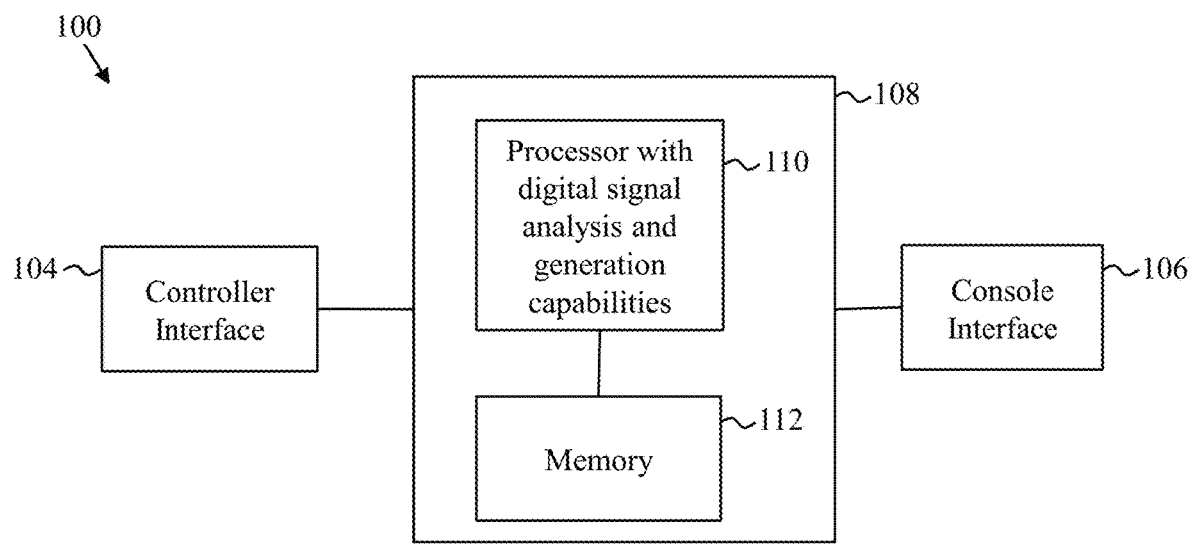
FIG. 7 shows a functional block diagram of an embodiment of an adapter of the present invention.

FIG. 1 shows an embodiment of adapter 100 attached to controller 10. FIG. 5 shows the embodiment of adapter 100 in isolation. FIG. 6 shows a functional block diagram of an embodiment of adapter 100 in relation to controller 10 and a video game console 20 in the prior art. As non-limiting examples, the console 20 may be a PlayStation™ (Sony Interactive Entertainment), Xbox™ (Microsoft Corporation), or Nintendo Switch™ (Nintendo PTD) console. FIG. 7 shows a functional block diagram of an embodiment of adapter 100 in isolation. In FIGS. 6 and 7, the elements are shown as being connected by lines that represent operative connections, which may be implemented by wired connections, wireless connections, or a combination of them.

In this embodiment, adapter 100 includes a housing 102 (FIG. 1) adapted for attachment to controller 10, by being partly disposed in a battery compartment on the bottom side of controller 10. The housing 102 also serves to retain other components of adapter 100, as described below.

Adapter 100 includes controller interface 104 (FIGS. 5 to 7) comprising means for scaling module 108 (described below) to receive the control signal generated by controller 10 via an output interface 16 of controller 10. In one embodiment, controller interface 104 comprises a cable connector, in the form of a male end of a USB connector that interfaces with the female end of a USB connector forming output interface 16 of controller 10.

Adapter 100 includes console interface 106 (FIGS. 5 to 7) comprising means for scaling module 108 (described below) to output the generated scaled control signal to console 20 via an input interface 22 of console 20. In one embodiment, controller interface 106 includes a cable connector, in the form of a female end of a USB connector that interfaces with a cable leading to a USB connector forming input interface 22 of console 22.

Adapter 100 includes a scaling module 108 comprising a processor 110 and a memory 112. As used herein, "processor" refers to any one or more electronic devices that is/are capable of reading and executing instructions stored on a memory to perform operations on data, which may be stored on a memory or provided in a data signal. Non-limiting examples of processors include devices referred to as microprocessors, microcontrollers, central processing units (CPU), and digital signal processors. The term "processor" includes a plurality of physically discrete, operatively connected devices despite use of the term in the singular.

As used herein, "memory" refers to a non-transitory tangible medium for storing information in a format readable by a processor, and/or instructions readable by a processor to implement an algorithm. Non-limiting types of memory include solid-state, optical, and magnetic computer readable media. The term "memory" includes a plurality of physically discrete, operatively connected devices despite use of the term in the singular.

A purpose of processor 110 is to execute a set of instructions stored on memory 112, in order to generate the scaled control signal based on the control signal received from controller 10, and output the scaled control signal to console interface 106, in accordance with a method of the present invention. In one embodiment, processor 110 and memory 112 are implemented by a microcontroller unit (MCU) (i.e., one or more integrated circuit chips) on a printed circuit board (PCB), which is operatively connected to controller interface 104 and console interface 106. In such embodiment, memory 112 may be considered as "firmware"—i.e., software specific to the hardware of adapter 100. It will be understood that the MCU is configured to be capable performing any arithmetic, logical, input/output data transfer, digital signal analysis and digital signal generation operations that are necessary to implement the method. The selection of a suitable MCU available in the art, and the programming of its memory 112 to implement such method, is within the skill of the person of ordinary skill in the art. It will also be understood that the scaling module 108 may include further components (not shown) such as a power source or an input for a power source, and electronic circuitry necessary for the operation of processor 110 and memory 112, and their interface with controller interface 104 and console interface 106.

Use and Operation, and Method of the Present Invention.

An exemplary use and operation of the above described embodiment of the system of the present invention is now described. To prepare the system, adapter 100 and trigger stop 60 are attached to controller 10 as shown in FIG. 1. Stick shield 40 is attached in it closed configuration to control stick 12 as shown in FIG. 2. USB connector of controller interface 104 is mated with USB connector of output interface 16 of controller 10, to effect an operative connection for transmission of a control signal from controller 10 to controller interface 104, as shown in FIG. 6. A USB cable is connected between console interface 106 and input interface 22 of console 20 to effect an operative connection for transmission of a scaled control signal from console interface 106 to console 20, as shown in FIG. 6.

The user uses controller 10 and console 20 to play a video game. The user displaces one of the actuators (i.e., control stick 12, or either one of trigger buttons 14a, 14b) from its neutral position, with the extent of such displacement being limited by one of the stop members (i.e., stick shield 40, or trigger stop 60). When the actuator is displaced, the controller 10 generates a control signal encoding data indicative of the displacement value of the actuator, in accordance with the ordinary operation of controller 10.

Under control of instructions stored in memory 112, processor 110 of scaling module 108 of adapter 100 implements a method of the present invention to generate a scaled control signal. It will be understood that the processor 110 may implement the method in respect to a control signal received either by actuation of control stick 12, either of trigger buttons 14, 14b, or some other actuator of controller 10.

Figure 8:
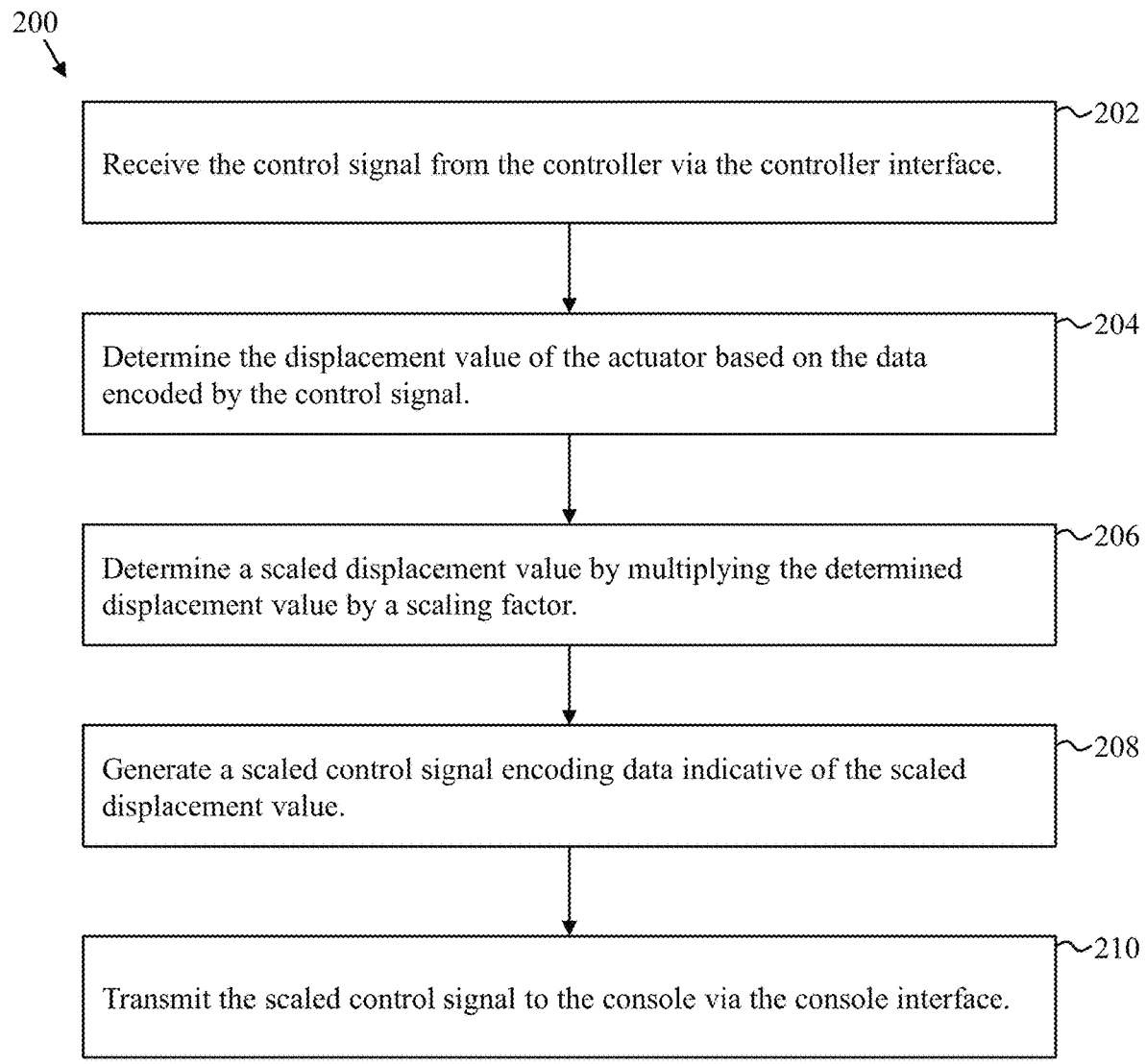
FIG. 8 shows a flow chart of steps of an embodiment of a method for generating a scaled control signal, in accordance with the present invention.

FIG. 8 shows an embodiment of this method 200. At step 202, processor 110 receives the control signal from controller 10 via the controller interface 104.

At step 204, processor 110 determines the displacement value of the actuator based on the data encoded by the control signal. For example, processor 110 may process a bit stream of the control signal to ascertain the displacement value of the actuator. In one embodiment, scaling module 108 may determine the displacement value by simply "reading" values of the bit stream that directly indicate the displacement value. In another embodiment, scaling module 108 may determine the displacement value by performing logical and/or arithmetic operations on values of the bit stream to derive the displacement value, in accordance with predetermined relationships between the data and displacement values. The particular manner of determining the displacement value will depend on the nature of the data encoded by the control signal, which will depend on the particular configuration of controller 10. Step 204 may be adapted accordingly.

At step 206, scaling module 108, determines a scaled displacement value by multiplying the determined displacement value by a scaling factor. As used herein, the "scaling factor" refers to a number.

Figure 9:
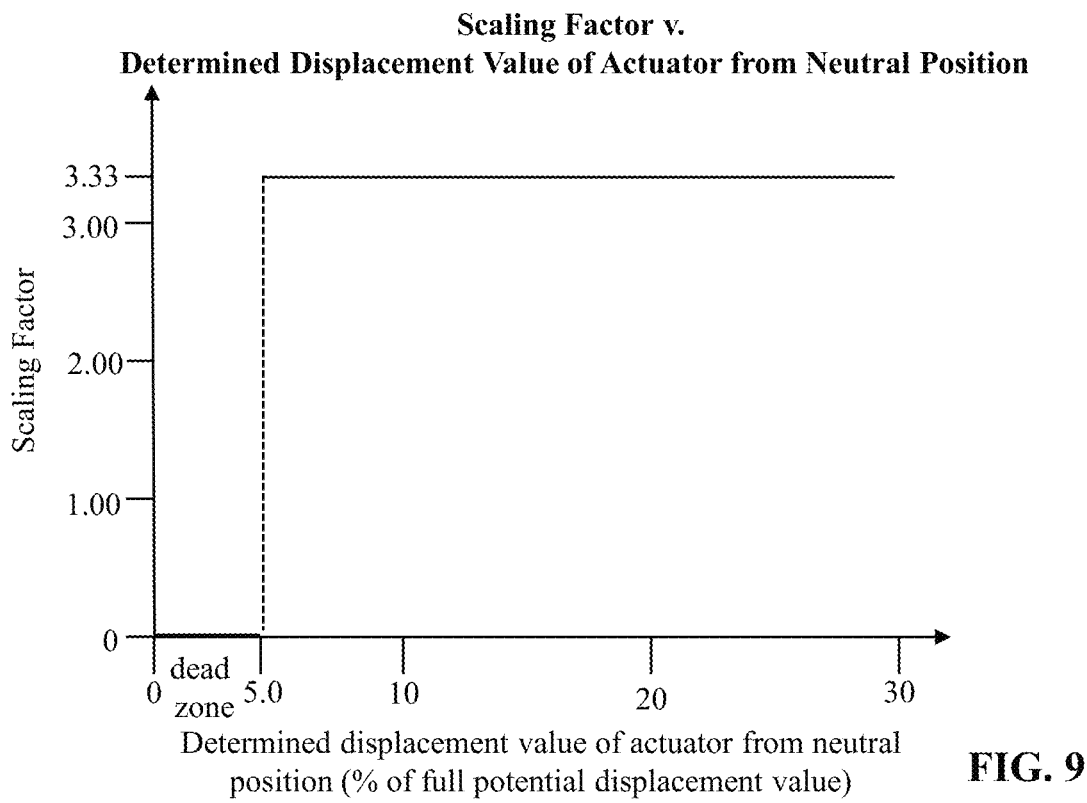
FIG. 9 shows a chart illustrating an embodiment of a relationship between a scaling factor and a determined displacement value of an actuator of a video game controller from a neutral position of the actuator.

In one embodiment, the scaling factor may be selected to enable adapter 100 to correct for any "drift" phenomenon of control stick 12. To illustrate, FIG. 9 shows a chart of a non-limiting embodiment of a relationship between a scaling factor and a displacement value of an actuator of a video game controller from a neutral position of the actuator, which relationship may be stored in memory 112 of scaling module 108. In this embodiment, the scaling factor has a null value if the determined displacement value of the actuator has a value less than a non-null predetermined value. This predetermined value is selected so as to effectively exclude a control signal that is generated by controller 10 when control stick 12 is actually in the neutral position. As a non-limiting example, in FIG. 9, the predetermined value may be set to 5.0 percent of the full potential displacement value, but it will be understood that other non-null values may be selected. Since the scaling factor has a null value up to 5.0 percent of the full potential displacement value, the scaled displacement value will be determined to be null. Accordingly, as will be apparent when considering subsequent steps 208 and 210, this range of determined displacement values effectively becomes a "dead zone" of control stick 12. In embodiments of the method, steps 208 and 210 may be performed even though the scaled displacement value is null—i.e., the scaled control signal will encode data indicative of a null scaled displacement value. In other embodiments of the method, performance of steps 208 and 210 may be conditional upon the scaled displacement value being non-null, or the scaling factor being non-null.

Figure 10:
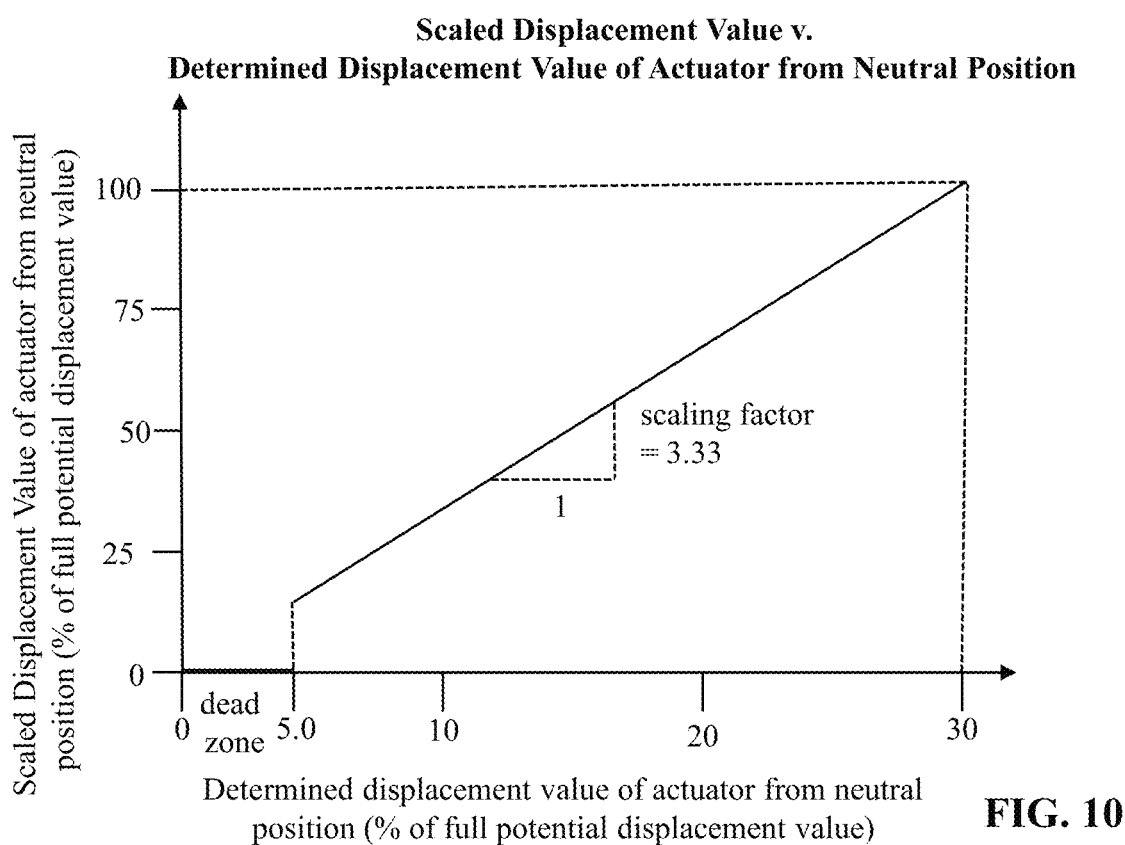
FIG. 10 shows a chart illustrating an embodiment of a relationship between the scaled displacement value and the determined displacement value of an actuator of a video game controller from a neutral position of the actuator, using the scaling factor of FIG. 9.

In an additional or alternative embodiment, the scaling factor may be selected to enable adapter 100 to generate a scaled control signal encoding data indicative of a displacement value of the actuator (e.g., control stick 12, or trigger buttons 14a, 14b) that is physically prevented by the presence of a stop member (e.g., stick shield 40, or trigger stop 60). For this example, suppose that the stop member limits displacement of the actuator to a maximum of 30 percent of the actuator's potential full displacement value. Further, suppose that when the actuator is displaced by 30 percent, it is desired that the adapter generates a scaled control signal encoding data indicative of the actuator being displaced to its full potential displacement value. Accordingly, the scaling factor is determined as the ratio of 100 to 30, or ~3.33, as shown in FIG. 9. In this embodiment, a constant scaling factor of ~3.33 is used for substantially the entire range of determined displacement values, excluding the "dead zone". In other words, the scaling ratio is determined as the ratio of the full potential displacement value of the actuator (i.e., without the stop member attached to controller 10), to the maximum possible displacement value of the actuator in the presence of the stop member attached to controller 10. FIG. 10 shows the relationship between the scaled displacement value and the determined displacement value of the actuator, as a result of applying the scaling factor of FIG. 9 to the determined displacement value of the actuator from the neutral position. In another embodiment (not shown), the scaling factor may be non-constant over the range of displacement values. This can be used to effectively modify the responsiveness and sensitivity characteristics of the actuator.

At step 208, scaling module 108 generates a scaled control signal encoding data indicative of the scaled displacement value. In one embodiment, scaling module 108 may generate the scaled control signal to include data that directly indicates the scaled displacement value. In another embodiment, scaling module 108 may generate the scaled control signal to include data that indirectly indicates the scaled displacement value, but which can be processed by logical and/or arithmetic operations performed by the operating system of console 20 to derive the scaled displacement value, in accordance with predetermined relationships between the data and displacement values. The particular manner of generating the scaled control signal will depend on the nature of the data required by the configuration of a particular console 20. Step 208 may be adapted accordingly.

At step 210, scaling module 108, transmits the scaled control signal to console 20 via console interface 106. The operating system of console 20 receives the scaled control signal, and processes the scaled control signal as if it were a control signal generated by controller 10. Accordingly, the present invention does not require any modification to console 20. In response to the scaled control signal, console 20 will initiate a game function as if the actuator had been displaced by the scaled displacement value rather than the displacement value encoded by data of the control signal generated by controller 10.

Alternative Method of the Present Invention.

Figure 11:
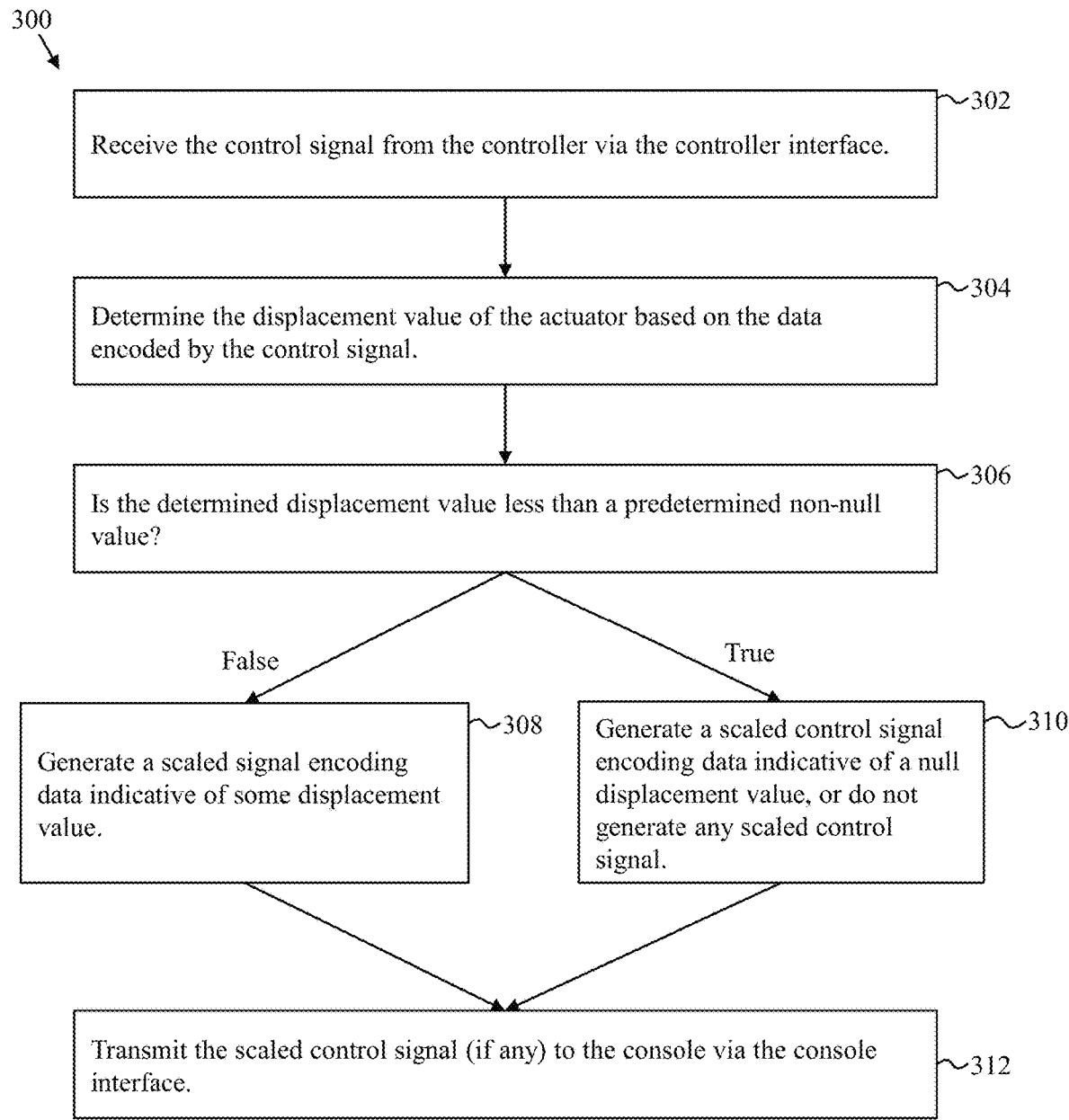
FIG. 11 shows a flow chart of steps of an embodiment of an alternative method for correcting drift of a control signal, in accordance with the present invention.

FIG. 11 shows an alternative embodiment of a method 300 that can be used to correct for any "drift" phenomenon of control stick 12.

Steps 300 and 304 are analogous to steps 202 and 204 of method 200.

At step 306, scaling module 108 evaluates if the determined displacement value is less than a predetermined non-null value (e.g., 5.0 percent of the full potential displacement value of the actuator, or some other pre-selected value).

If this condition evaluates "false", then the method proceeds to step 308. At step 308, scaling module 108 generates the scaled control signal encoding data indicative of some displacement value. For example, step 308 may be implemented in a manner analogous to steps 206 and 208 of method 200, or the scaling factor may be set to unity (1.0). Alternatively, step 308 may be implemented without applying any scaling factor to the determined displacement value.

Conversely, if the condition at step 306 evaluates "true", then the method proceeds to step 310. At step 310, in one embodiment, scaling module 108 generates a scaled control signal encoding data indicative of a null displacement value. It will be appreciated that this is analogous to cases of step 206, in which the scaling factor is set to null. In another embodiment of step 310, scaling module 108 does not generate any scaled control signal at all.

At step 312, scaling module 108 transmits the scaled control signal (if any) to console 20 via console interface 106. The operating system of console 20 receives the scaled control signal, and processes the scaled control signal as if it were a control signal generated by controller 10.

Exemplary Aspects of the Present Invention.

In view of the described devices, systems, and methods and variations thereof, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system for generating a scaled control signal for a video game console using a video game controller comprising an actuator, wherein the controller is configured to generate a control signal encoding data indicative of a displacement value of the actuator from a neutral position of the actuator, the system comprising:

a controller interface for receiving the control signal from the controller;

a console interface for transmitting the scaled control signal to the console;

a processor operatively connected to the controller interface to receive the control signal from the controller interface, and operatively connected to the console interface to transmit the scaled control signal to the console interface; and a memory comprising a non-transitory computer readable medium operatively connected to the processor, and storing instructions executable by the processor to implement a method comprising the steps of:

(a) receiving the control signal from the controller interface;

(b) determining the displacement value of the actuator based on the data encoded by the control signal;

(c) determining a scaled displacement value by multiplying the determined displacement value by a scaling factor;
(d) generating the scaled control signal encoding data indicative of the scaled displacement value; and
(e) transmitting the scaled control signal to the console interface.

Aspect 2: The system of Aspect 1, wherein the system further comprises a housing retaining the controller interface, the console interface, the processor, and the memory, and adapted for attachment to the controller.

Aspect 3: The system of any one of Aspects 1 to 2, wherein the controller interface comprises a first cable connector.

Aspect 4: The system of any one of Aspects 1 to 3, wherein the console interface comprises a second cable connector.

Aspect 5: The system of any one of Aspects 1 to 4, wherein the scaling factor is null if the determined displacement value is less than a predetermined non-null value.

Aspect 6: The system of Aspect 5, wherein performance of steps (d) and (e) are conditional on either the determined scaled displacement value being a non-null value, or the scaling factor being a non-null value.

Aspect 7: The system of any one of Aspects 1 to 4, wherein performance of steps (c), (d), and (e) are conditional on the determined displacement value being less than a predetermined non-null value.

Aspect 8: The system of any one of Aspects 1 to 4, wherein the scaling factor is constant for different determined displacement values.

Aspect 9: The system of any one of Aspects 1 to 4, wherein the scaling factor is non-constant for different determined displacement values.

Aspect 10: The system of any one of Aspects 1 to 9, further comprising a stop member attachable to the controller to permit limited displacement of the actuator from the neutral position.

Aspect 11: The system of Aspect 10, wherein the actuator comprises a directional control stick.

Aspect 12: The system of Aspect 11, wherein the stop member comprises a collar that surrounds the control stick when attached to the controller.

Aspect 13: The system of Aspect 12, wherein the stop member attaches to the control stick to move in unison with the control stick, and wherein the stop member engages a portion of the controller, other than the control stick, to limit displacement of the control stick from the neutral position.

Aspect 14: The system of Aspect 13, wherein the collar comprises a pair of arcuate portions that clamp the control stick between them to attach the collar to the control stick.

Aspect 15: The system of Aspect 14, wherein the arcuate portions are pivotally connected to each other to allow for separation of opposing ends the arcuate portions from each other.

Aspect 16: The system of any one of Aspects 14 to 15, wherein one of the arcuate portions defines a tab, and the other one of the arcuate portions defines a slot that releasably receives the tab by friction fit.

Aspect 17: The system of Aspect 10, wherein the actuator comprises a trigger button.

Aspect 18: The system of Aspect 17, wherein the stop member attaches to a portion of the controller, other than the trigger button, and is engaged by the trigger button to limit displacement of the trigger button from the neutral position.

Aspect 19: The system of any one of Aspects 10 to 18, wherein the scaling factor is a ratio of a maximum possible displacement of the actuator from the neutral position when the stop member is not attached to the controller, to a maximum possible displacement of the actuator from the neutral position when the stop member is attached to the controller.

Aspect 20: A method for generating a scaled control signal for a video game console using a video game controller comprising an actuator, wherein the controller is configured to generate a control signal encoding data indicative of on a displacement value of an actuator from a neutral position of the actuator, the method comprising the steps of:
using a processor:
(a) receiving the control signal from the controller;
(b) determining the displacement value of the actuator based on the data encoded by the control signal;
(c) determining a scaled displacement value by multiplying the determined displacement value by a scaling factor;
(d) generating a scaled control signal encoding data indicative of the scaled displacement value; and
(e) transmitting the scaled control signal to the console.

Aspect 21: The method of Aspect 20, further comprising the step of attaching a housing to the controller, wherein the housing retains the processor.

Aspect 22: The method of any one of Aspects 20 to 21, wherein the processor receives the control signal from the controller via a first cable connector.

Aspect 23: The method of any one of Aspects 20 to 22, wherein the processor transmits the scaled control signal to the console via a second cable connector.

Aspect 24: The method of any one of Aspects 20 to 23, wherein the scaling factor is null if the determined displacement value is less than a predetermined non-null value.

Aspect 25: The method of Aspect 24, wherein performance of steps (d) and (e) are conditional on either the determined scaled displacement value being a non-null value, or the scaling factor being a non-null value.

Aspect 26: The method of any one of Aspects 20 to 23, wherein performance of steps (c), (d), and (e) are conditional on the determined displacement value being less than a predetermined non-null value.

Aspect 27: The method of any one of Aspects 20 to 23, wherein the scaling factor is constant for different determined displacement values.

Aspect 28: The method of any one of Aspects 20 to 23, wherein the scaling factor is non-constant for different determined displacement values.

Aspect 29: The method of any one of Aspects 20 to 28, further comprising the step of attaching a stop member to the controller to permit limited displacement of the actuator from the neutral position.

Aspect 30: The method of Aspect 29, wherein the actuator comprises a directional control stick.

Aspect 31: The method of Aspect 30, wherein the stop member comprises a collar that surrounds the control stick when attached to the controller.

Aspect 32: The method of Aspect 31, wherein the stop member attaches to the control stick to move in unison with the control stick, and wherein the stop member engages a portion of the controller, other than the control stick, to limit displacement of the control stick from the neutral position.

Aspect 33: The method of Aspect 32, wherein the collar comprises a pair of arcuate portions that clamp the control stick between them to attach the collar to the control stick.

Aspect 34: The method of Aspect 33, wherein the arcuate portions are pivotally connected to each other to allow for separation of opposing ends of the arcuate portions from each other.

Aspect 35: The method of any one of Aspects 33 to 34, wherein one of the arcuate portions defines a tab, and the other one of the arcuate portions defines a slot that releasably receives the tab by friction fit.

Aspect 36: The method of Aspect 29, wherein the actuator comprises a trigger button.

Aspect 37: The method of Aspect 36, wherein the stop member attaches to a portion of the controller other than the trigger button, and is engaged by the trigger button to limit displacement of the trigger button from the neutral position.

Aspect 38: The method of any one of Aspects 29 to 37, wherein the scaling factor is a ratio of a maximum possible displacement of the actuator from the neutral position when the stop member is not attached to the controller, to a maximum possible displacement of the actuator from the neutral position when the stop member is attached to the controller.

Aspect 39: A stop member for permitting limited displacement of a directional control stick of a video game controller from a neutral position of the control stick, the stop member comprising a collar that surrounds the control stick when attached to the controller.

Aspect 40: The stop member of Aspect 39, wherein the stop member attaches to the control stick to move in unison with the control stick, and wherein the stop member engages a portion of the controller, other than the control stick, to limit displacement of the control stick from the neutral position.

Aspect 41: The stop member of Aspect 40, wherein the collar comprises a pair of arcuate portions that clamp the control stick between them to attach the collar to the control stick.

Aspect 42: The stop member of Aspect 41, wherein the arcuate portions are pivotally connected to each other to allow for separation of opposing ends of the arcuate portions from each other.

Aspect 43: The stop member of any one of Aspect 41 to 42, wherein one of the arcuate portions defines a tab, and the other one of the arcuate portions defines a slot that releasably receives the tab by friction fit.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A system for generating a scaled control signal for a video game console using a video game controller, the system comprising an adapter attachable to the video game controller, the adapter comprising:
  a controller interface for receiving a control signal from the video game controller;
  a console interface for transmitting the scaled control signal to the video game console; and
  at least one processor coupled to the controller interface and the console interface, the at least one processor being configured for:
    (i) receiving the control signal from the controller interface;
    (ii) determining the displacement value of an actuator, of the video game controller, based on the data encoded by the control signal;
    (iii) determining a scaled displacement value by multiplying the determined displacement value by a scaling factor;
    (iv) generating the scaled control signal encoding data indicative of the scaled displacement value; and
    (v) transmitting the scaled control signal to the console interface.

2. The system of claim 1, wherein the adapter further comprises a housing retaining the controller interface, the console interface, and the processor.

3. The system of claim 1, wherein the scaling factor is null if the determined displacement value is less than a predetermined non-null value.

4. The system of claim 3, wherein performance of (iv) and (v) are conditional on either the determined scaled displacement value being a non-null value, or the scaling factor being a non-null value.

5. The system of claim 1, wherein performance of (iii), (iv) and (v) are conditional on the determined displacement value being less than a predetermined non-null value.

6. The system of claim 1, wherein the scaling factor is constant for different determined displacement values or is non-constant for different determined displacement values.

7. The system of claim 1, further comprising a stop member attachable to the controller to permit limited displacement of the actuator from the neutral position.

8. The system of claim 7, wherein the actuator comprises a directional control stick and the stop member comprises a collar that surrounds the control stick when attached to the controller.

9. The system of claim 8, wherein the stop member attaches to the control stick to move in unison with the control stick, and wherein the stop member engages a portion of the controller, other than the control stick, to limit displacement of the control stick from the neutral position.

10. The system of claim 9, wherein the collar comprises a pair of arcuate portions that clamp the control stick between them to attach the collar to the control stick.

11. The system of claim 10, wherein the arcuate portions are pivotally connected to each other to allow for separation of opposing ends the arcuate portions from each other.

12. The adapter of claim 7, wherein the scaling factor is a ratio of a maximum possible displacement of the actuator from the neutral position when the stop member is not attached to the controller, to a maximum possible displacement of the actuator from the neutral position when the stop member is attached to the controller.

13. A method for using an adapter for generating a scaled control signal for a video game console using a video game controller, the method comprising:
  receiving, using at least one processor of the adapter, a control signal from a controller interface of the adapter, the control interface being coupled to the video game controller;
  determining, using the at least one processor, the displacement value of an actuator, of the video game controller, based on the data encoded by the control signal;
  determining, using the at least one processor, a scaled displacement value by multiplying the determined displacement value by a scaling factor;
  generating, using the at least one processor, the scaled control signal encoding data indicative of the scaled displacement value; and
  transmitting, using the at least one processor, the scaled control signal to a console interface of the adapter, wherein the consol interface is coupled to the video game console.

14. The method of claim 13, further comprising the step of attaching a housing of the adapter to the controller, wherein the housing retains the at least one processor.

15. The method of claim 13, wherein the scaling factor is null if the determined displacement value is less than a predetermined non-null value.

16. The method of claim 15, wherein performance of (iv) and (v) are conditional on either the determined scaled displacement value being a non-null value, or the scaling factor being a non-null value.

17. The method of claim 13, wherein performance of (iii), (iv) and (v) are conditional on the determined displacement value being less than a predetermined non-null value.

18. The method of claim 13, wherein the scaling factor is constant for different determined displacement values, or is non-constant for different determined displacement values.

19. The method of claim 13, wherein the scaling factor is a ratio of a maximum possible displacement of the actuator from a neutral position when a stop member is not attached to the controller, to a maximum possible displacement of the actuator from the neutral position when the stop member is attached to the controller.

20. An adapter for generating a scaled control signal for a video game console using a video game controller, the adapter comprising:
  a controller interface for receiving a control signal from the video game controller;
  a console interface for transmitting the scaled control signal to the video game console; and
  at least one processor coupled to the controller interface and the console interface, the at least one processor being configured for:

(i) receiving the control signal from the controller interface;
(ii) determining the displacement value of an actuator, of the video game controller, based on the data encoded by the control signal;
(iii) determining a scaled displacement value by multiplying the determined displacement value by a scaling factor;
(iv) generating the scaled control signal encoding data indicative of the scaled displacement value; and
(v) transmitting the scaled control signal to the console interface.

* * * * *